United States Patent [19]
Rossiter et al.

[11] 3,874,835
[45] Apr. 1, 1975

[54] FACE-CUTTING APPARATUS FOR FORMING PELLETS

[75] Inventors: Paul H. Rossiter, Paoli; Richmond S. Parsons, Warminster, both of Pa.

[73] Assignee: Welding Engineers, Inc., King of Prussia, Pa.

[22] Filed: Feb. 12, 1973

[21] Appl. No.: 331,603

Related U.S. Application Data

[63] Continuation-in-part of Ser. No. 130,586, April 2, 1971, abandoned.

[52] U.S. Cl................ 425/306, 241/60, 241/82.7, 425/313, 425/289
[51] Int. Cl................ B29c 17/14, B29b 1/02
[58] Field of Search............ 425/313, 310, 311, 67, 425/306; 241/82.2, 82.7, 88, 60, 89.1

[56] References Cited
UNITED STATES PATENTS

| | | | |
|---|---|---|---|
| 1,628,998 | 5/1927 | Rollman | 241/82.7 X |
| 2,440,927 | 5/1948 | Boss et al. | 241/89.2 |
| 2,476,695 | 7/1949 | Cadella | 241/82.2 |
| 2,775,788 | 1/1957 | Andrew | 425/313 |
| 2,841,197 | 7/1958 | Ardrey | 241/82.2 |
| 3,246,594 | 4/1966 | Fisher | 425/313 X |
| 3,316,590 | 5/1967 | Rettig | 425/67 |
| 3,676,029 | 7/1972 | Hopkin | 425/311 X |
| 3,753,637 | 8/1973 | Gasior et al. | 425/313 |

Primary Examiner—Robert L. Spicer, Jr.

[57] ABSTRACT

A cutter used with a cylindrically shaped die plate on a plastics extruder is rotatable about the axis of the die plate and has a plurality of radially projecting blades that sweep across the downstream face of the die plate as the cutter rotates, severing the extruded plastic into pellets. The cutter blades form channels within which the pellets collect as the cutter rotates. The cutter is enclosed and a pellet treatment fluid is caused to flow along the channels in contact with the pellets as the pellets are severed.

23 Claims, 11 Drawing Figures

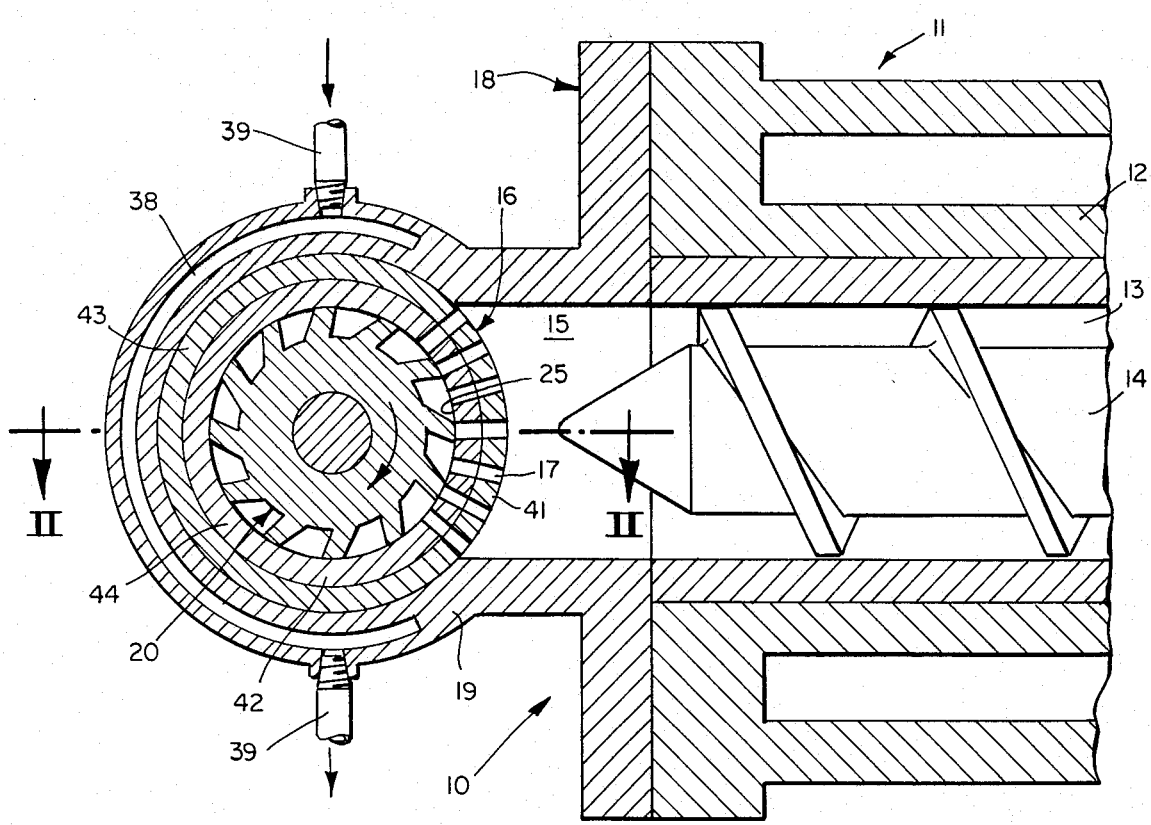
Fig. 1
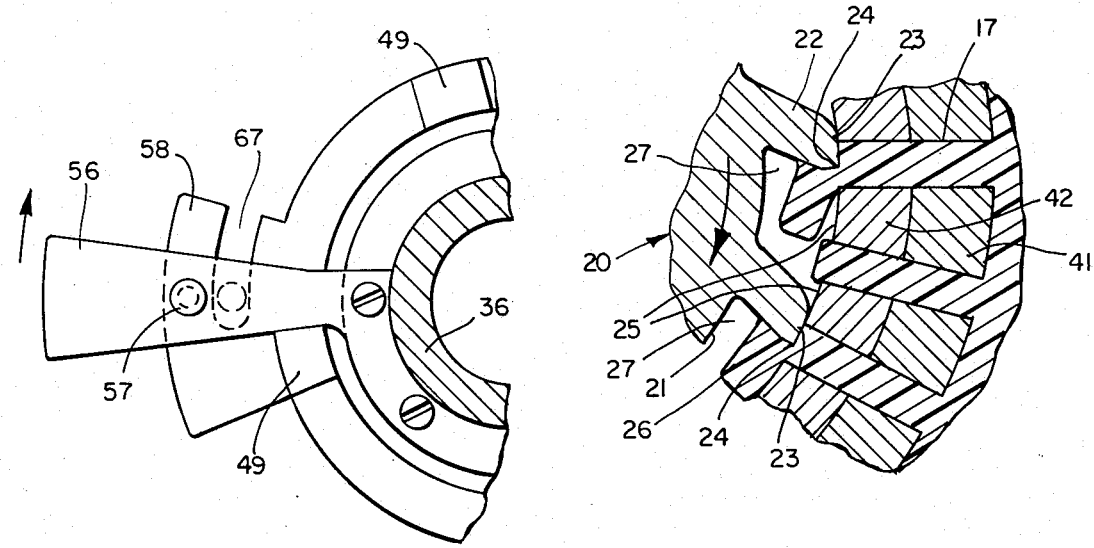
Fig. 3
Fig. 4

FACE-CUTTING APPARATUS FOR FORMING PELLETS

CROSS-REFERENCE TO RELATED APPLICATIONS

This is a continuation-in-part of application Ser. No. 130,586, filed Apr. 2, 1971, now abandoned.

BACKGROUND OF THE INVENTION

This invention relates to face-cutting apparatus for making and treating pellets of thermoplastic material.

One type of face-cutting apparatus is disclosed in U.S. Pat. No. 3,316,590. In such apparatus, the die plate associated with the extruder is cylindrically shaped and is provided with radially extending extrusion orifices through which heat-plastified material is extruded by reason of the operation of a rotating feedscrew which pressurizes the material upstream of the die plate means. The blade of a single-lead cutter has a cutting edge associated with the downstream face of the die plate, and which shears heat-plastified material extruded through the orifices into pellets. The cutter is enclosed to establish a chamber receiving circulating liquid or gaseous coolant which serves to improve the cutting efficiency and to collect the pellets as they are formed.

The pellet thickness achieved with apparatus of the type described depends upon the rate of rotation of the cutter and the rate at which the plastic material is extruded. If the cutter speed is essentially constant, variations in pellet thickness can be attributed to changes in the rate of extrusion. Such rate is determined in large part by the viscosity of the thermoplastic material just upstream of the die plate means. As the viscosity increases, due to upstream temperature reduction, for example, less material is extruded per unit time, and the resultant pellets will be thinner than when the viscosity decreases. In many processes, variations in pellet thickness are not important. In processes where uniformity is necessary because of size considerations or because of a need to remove a uniform percentage of volatiles from all of the pellets, apparatus heretofore available has not proved to be successful. The primary object of the present invention, therefore is to provide face-cutting apparatus which can effect the high-speed production of uniform pellets.

BRIEF SUMMARY OF THE INVENTIVE FEATURES

Briefly, the invention involves a novel combined cutter configuration and die plate. As to the cutter, it has a plurality of blades projecting radially from a cylindrical body and extending longitudinally therealong. At the free end of each blade is a cutting edge that is operatively associated with the downstream side of the die plate, so that upon rotation of the cutter, heat-plastified material extruded through the orifices of the die plates is sheared into pellets. Adjacent pairs of blades on the cutter and the intervening body portion establish continuous longitudinally extending channels into which the newly sheared pellets collect.

Where the blades are helically arranged on the body of the cutter, rotation of the cutter in one direction causes the blades to appear to advance in one axial direction. By supplying a stream of a pellet-treating fluid to a chamber enclosing the cutter and causing such fluid to flow in one helical direction, pellets are sheared sequentially in this direction along longitudinal lines of the die plate permitting the treating fluid to flush through the helical channels formed between the cutter blades and the die plate, and to sweep each pellet from the cutting edge of a blade as the plastic is cut into a pellet. The cut pellets can be collected at the downstream end of the cutter. This arrangement prevents pellets from accumulating in the channels and interfering with the cutting operation, and at the same time achieves the desired devolitalization of the pellets.

SPECIFIC DISCUSSION OF FEATURES

Desirably a pair of nested die plates are mounted for selective positioning relative to one another. In various relative positions of the nested die plates certain orifices in the plates are essentially aligned.

The die plate means may also comprise a pair of nested die plates, one of which is fixed, and the other of which is rotatable, and with the rotatable one having only a single set of holes that are alignable with the set of holes in the fixed die plate, or, upon rotation or arcuate movement of the movable die plate relative to the fixed die plate, the set of holes on the movable die plate may be moved completely into or out of registry with the holes of the fixed die plate, in order to move the apparatus into a shut-off condition. Such motion, for example, may be through any suitable arc, e.g. 90°, 120°, or the like.

Also, in accordance with this invention, several groups of holes may be provided on a die plate; the sets may be identical to each other. This avoids the necessity of taking the apparatus apart in order to change a die plate, due to wear. It is generally preferable that the hole sizes through the orifice remain constant. Any wear that would cause enlargement of the orifices may be undesirable. Thus, as the plates wear, it becomes a simple matter to merely rotate or move the movable member of the pair of nested die plates through an arc of, for example, 90° if four such sets of holes are utilized, or through an arc of 120° if three such sets of holes are utilized on the movable or rotatable member.

Also, by utilizing a pair of nested die plates, each of generally cylindrical construction, nested together, deformation of die plates is avoided. For example, it has been known to utilize two planar die plates, having holes, and with one of the die plates being movable relative to the other, to allow alignment of holes in a fixed plate with holes in a movable plate. However, because of the pressures generated upstream, a concave deformation tends to take place, preventing movement of the movable plate relative to the fixed plate. By the use of cylindrical plates, extraordinary resistance to deformation becomes a pronounced advantage.

BRIEF DESCRIPTIONS OF THE DRAWINGS

FIG. 1 is a longitudinal sectional view of a face-cutting apparatus made in accordance with the present invention.

FIG. 3 is a view taken along the line III—III in FIG. 2.

FIG. 4 is an enlarged fragmentary sectional view of the nested die plates of FIG. 1.

DETAILED DESCRIPTION

Figure 2:
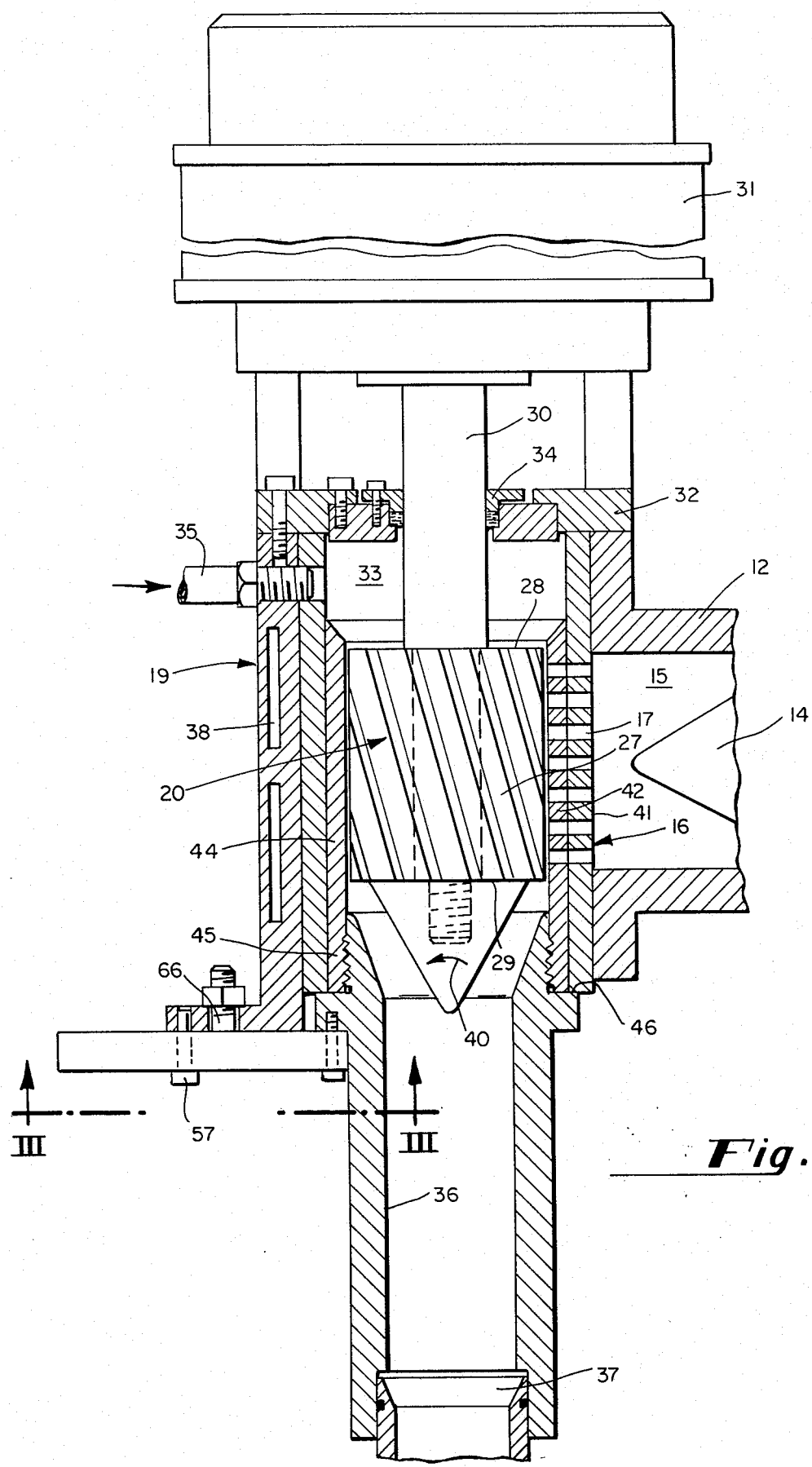
FIG. 2 is a longitudinal sectional view taken along the line II—II of FIG. 1.

Referring now to FIG. 1 in detail, the face-cutting apparatus of the present invention is designated generally by reference numeral 10, and is associated with an extrusion device 11 comprising an extrusion chamber 12 having a mixing or kneading bore 13 within which is mounted rotatable feed screw 14 driven from a power source (not illustrated). Downstream of the chamber 12 is a pressure chamber 15 into which heat-plastified material is delivered by the rotation of screw 14. At the remote end of the device 11 is a cylindrical shaped die plate means 16 having a plurality of radially extending orifices 17 through which heat-plastified material is extruded due to the pressure built up in chamber 15 by the rotation of screw 14.

Attached to the downstream end of extruder 11 is a transverse cutter-head 18 comprising a housing 19 and a cutter 20 which has a cylindrical body 21 mounted for rotation about its longitudinal axis which is aligned with the axis of die plate 16, and which axis is perpendicular to the axis of extruder screw 14. Cutter 20 also has a plurality of plates 22 projecting radially from and extending helically along body 21 at an angle of less than 45° to the axis of cylindrical body 21. (see FIG. 2). Each of plates 22 has, on its free end 23, a cutting edge 24 which is close to the downstream face 25 of die plate 16. As a consequence, material extruded through orifice 17 is sheared or cut by edges 24 on the cutter, as the latter rotates. The resultant pellets 26 formed by the cutting operation have a size determined by the orifice means 17. The thickness or length of the pellets 26 is dependent upon the speed of rotation of the cutter means 20, and the pressure and flow rate of the heat-plastified material in the chamber 15.

As is best seen in FIG. 4, adjacent pairs of blades 22 and the intervening portion of body 21 of the cutter establish longitudinally extending helically arranged channels 27 into which pellets 26 fall after being cut by edges 24 of the cutter means. Face 25 of the die plate closes the longitudinal portion of channel 27 while the blades are adjacent orifices 17 so that the channels are open only at their ends 28 and 29 as shown in FIG. 2. As shown, the channels 27 are quite narrow, having a width that is less than three times the distance between the centers of orifices 17.

As seen in FIG. 2, cutter 20 is mounted on support shaft 30 which is cantilevered from electric motor 31 rigidly attached to end plate 32 which closes the axial end of housing 19 adjacent axial end 28 of the cutter means. Plate 32 is spaced from end 28 of the cutter means to establish inlet chamber 33 which is closed to ambient atmosphere by seal 34 mounted in plate 32 and surrounding shaft 30. Chamber 33 is pressurized through conduit 35 with treatment fluid which flows from end 28 to end 29 of the cutter means through channels 27 carrying the pellets, as they are sheared from face 25, away from the cutting edges 24 of the blades and into the receiver tube 36 attached to the die plate 16 adjacent end 29 of the cutter means. The treatment fluid in tube 36, laden with pellets, flows into chamber 37 in which the pellets are separated from the fluid. In a conventional manner, the fluid may be recycled into the chamber 33, and the pellets removed for further processing.

The flow of fluid in channels 27 is enhanced by the pumping action created by the rotation of the cutter means 20 in the direction indicated by the arrow 40 in FIG. 2. The helical nature of blades 22 cause them, when the cutter means is rotating, to act as a pump on the treatment fluid. Accordingly, in some instances such pumping action provided by the blades 22 may obviate the necessity of otherwise pressurizing fluid delivered through the line 35, for example, if desired. The pumping action of the blades 22 when the cutter means is rotating, as it acts upon the treatment fluid, is in such a way that the blades 22 tend to advance the cut pellets from the axial end 28 toward the axial end 29, the same direction in which the flow of fluid occurs. Because the blades are helically arranged, rotation of the cutter means causes the cutting edge of a blade to traverse the face 25 of the die plate means along a generatrix thereof, in the same direction as the flow of fluid. Extruded material is severed sequentially, each pellet being flushed toward tube 36 immediately after the pellet is severed and before the cutting edge severs the next pellet.

Housing 19 is provided with an internal circulation chamber 38 within which conditioning fluid can be circulated by means of conduits 39. This arrangement permits the temperature of the cutter-head to be closely controlled during the face-cutting operation. In other words, the cutting head can be heated or cooled by providing suitable conditioning fluid to conduits 39.

The treatment of fluid may be gas or liquid, depending upon the type of plastic material being extruded. The inlet fluid can be heated to heat the pellets or cooled to extract heat from the pellets, depending upon the process involved. By providing a closed environment for the cutting operation, a reducing or inert gas can be used as the treatment fluid when the material being extruded is sensitive to oxidation. In addition, crumbs of material generated along with the pellets during the cutting process are withdrawn as they are generated, and chuted to a collection zone eliminating the problem of build-up on structural members adjacent the cutter means. More importantly, however, the closed environment permits the treatment fluid to be used to remove volatiles from the pellets. If the latter are dimensionally uniform, it is possible with this arrangement to insure that a predetermined amount of volatiles will be removed from each pellet thus permitting this arrangement to produce large masses of homogeneous pellets.

The use of a liquid treatment fluid, such as water, in conventional face-cutting apparatus, usually requires special procedures during start-up and shut-down of the extruder means in order to keep the liquid from back-flowing through the orifices of the die plate means and into the pressure chamber where the feed screw of the extruder operates. Such procedures usually involve a predetermined start-up and shut-down cycle of operation during which treatment fluid is cut off from the cutter housing. In many instances, this causes overheating of the cutter and permits pellets to build up and clog the cutter and various auxillary apparatus. In addition, the pellet produced during these cycles is not identical to that produced when the treatment fluid is present.

These problems are solved by the novel die plate means disclosed herein.

With specific reference to FIG. 1, the die plate means 16 comprises a pair of nested die plates 41, 42 mounted for selective positioning relative to one another. Each pair of die plates has radially extending orifices. The orifices of the radial outermost plate 41 are generally fixedly positioned. In the embodiment of FIGS. 1 and 4, for example, the orifices of the innermost plate 42 are arranged to be aligned with the orifices of the plate 41, but, upon pivoting or rotation of the generally cylindrical member 44, such that its plate 42 is rotated such that the holes thereof are disposed out of alignment with the holes of the plate 41, the device may be shut off. It will be noted, that because of the cylindrical configuration of the plate 41 (at least that portion that is exposed to the chamber 15), there is substantial resistance to buckling or any deformation of the plate 41 under pressure of the chamber 15. Such resistance to deformation thereby prevents the plate 41 from tightly frictionally engaging the plate 42 in such a manner as would prevent rotation of the plate 42.

It will further be apparent that by virtue of this arcuate, generally cylindrical configuration for at least that portion of the plate 41 that is exposed to the chamber 15 (but preferably the entire plate being constructed as a cylinder 43), the inner or downstream-most cylinder 44 may be rotated an amount to shut the system off, if desired.

The relative positions of the die plates can be manually or automatically changed to alter the matching of orifices in the die plates if desired. By totally mismatching the orifices in the two plates, the cutting chamber containing the cutter means and the treatment fluid can be disconnected from the pressure chamber containing the heat-plastified material, in which instance, of course, the path of flow through the orifices 17 is blocked. When the die plates have this relative position, the start-up and shut-down cycle is reduced to a negligible period of time. In addition, the treatment fluid can be used to flush out the cutting chamber after shut-down of the feed screw 14 of the extruder in preparation for the next face-cutting operation.

In the preferred form of the invention, upstream die plate 41 is formed as part of outer tubular cylinder 43 which is rigidly secured to housing 19. Downstream die plate 42 is formed as part of a concentric inner tubular cylinder 44 which is dimensioned so as to be slidably movable in cylinder 43 in an angular direction of movement. Rigidly attached to one end 45 of inner cylinder 44 is receiver tube 36 as shown in FIG. 2. Tube 36, adjacent the end attached to cylinder 44, has limit shoulder 46 that projects outwardly beyond the periphery of inner tube 44 and can abut the lower end of outer tube 43, as illustrated in FIG. 2.

To hold the orifices in die plates 41 and 42 in the aligned position illustrated in FIG. 1, for example, the angular position of inner cylinder 44 must be established. This is done by providing, on tube 36, radial arm 56 which projects between arcuately spaced stops or extensions 49, as shown in FIG. 3, and which is provided with removable pin 57, slidably received in a suitable hole in flange 58 forming a part of housing 19.

It may be desirable, in some instances, to use only a single die plate, rather than the two nested die plates discussed herein above. However, it is preferred to use a pair of nested die plates.

With reference to FIGS. 2 and 3, it will be noted that manual movement of the inner cylinder 44 in accordance with this invention may be accomplished by withdrawing pin 57 from its mating hole in flange 58, and then manually rotating arm 56. Rod 66 rigidly attached to the arm 56 projects through slotted holes 67 in flange 58 to permit angular movement of the cylinder 44 an amount sufficient to shut off the openings through the plates between upstream and downstream sides of the plate means. The rod 66 may be threaded, in order to securely fasten the arm 56, such that the orifices of the nested plates remain in communicating position with each other as illustrated in FIG. 1, and in FIG. 4, with the threaded fastening for the member 66 providing additional security in this regard, over and above the detent means provided by the pin 57.

It will be noted that this manual adjustment permits the chamber 15 to be selectively connected to the cutting chamber, and facilitates start-up and shut-down procedures, in a manner described above to some degree.

With reference to FIGS. 5 through 9, there is illustrated an alternative apparatus 100, in accordance with this invention, wherein the inner cylinder is rotatable to a number of discreet or separate positions, relative to the orifices in the upstream-most plate, with facility for indexing the cylindrical inner plate into a plurality of positions. It will be understood that in the apparatus 100 illustrated, three such positions, established by sets of holes 120° apart are disclosed, but that, in some instances it may be desirable to utilize other groups, such as four sets of holes in the movable plate, each of which is optionally and selectively capable of being matched with the group of holes in the fixed plate.

Figure 5:
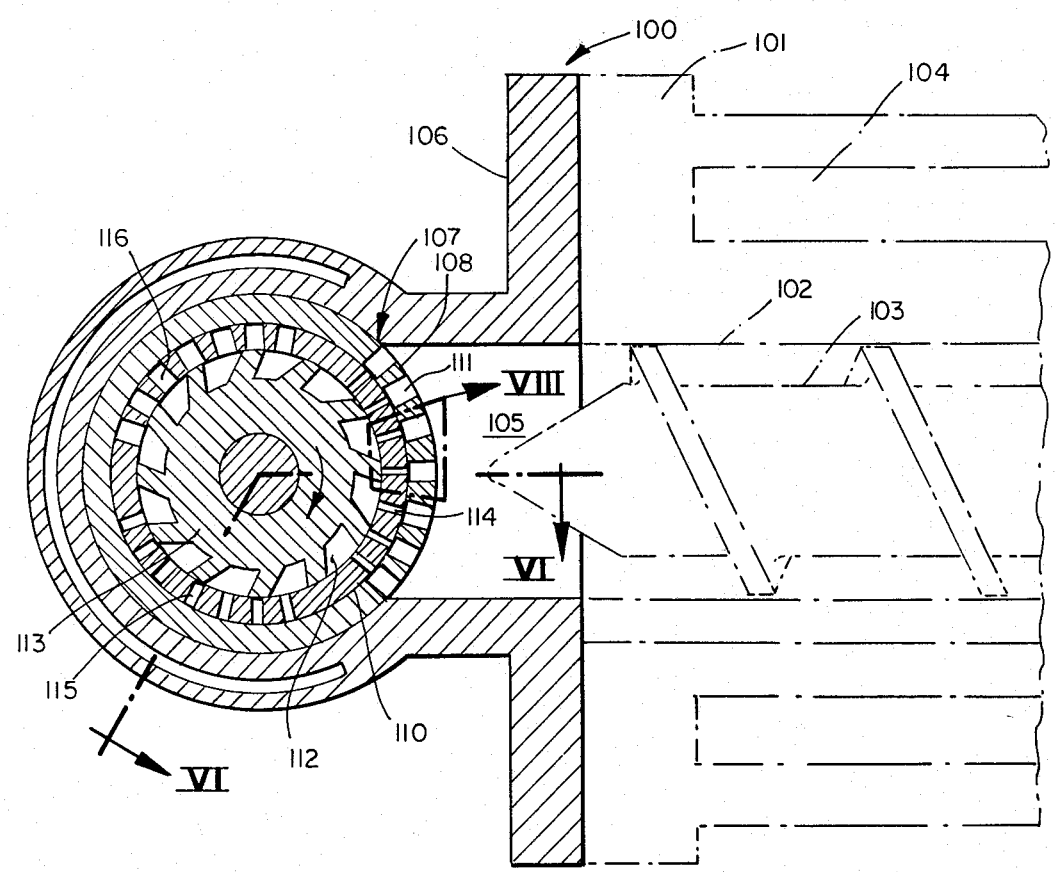
FIG. 5 is a view similar to that of FIG. 1, but partially in phantom, and showing an alternative construction.
Figure 8:
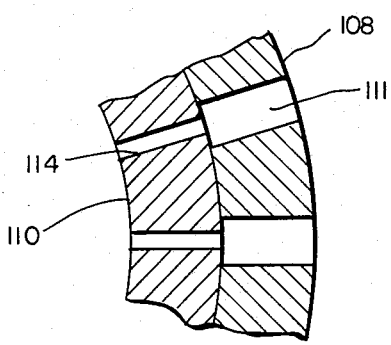
FIG. 8 is an enlarged fragmentary sectional view of the detail of the two die plates indicated by the zone VIII of FIG. 5.
Figure 9:
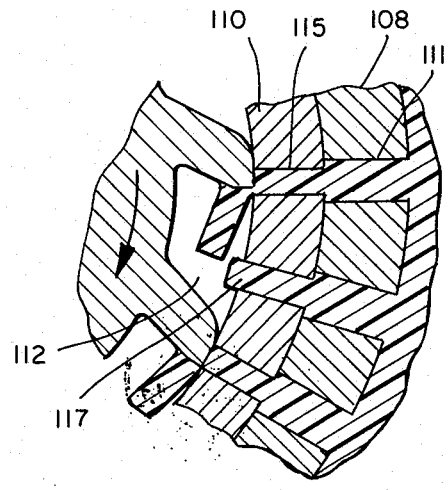
FIG. 9 is a view similar to that of FIG. 4, but wherein the die plate is illustrated as progressing from a larger orifice to a smaller orifice, as the material flows toward the face-cutting means.

The apparatus 100 includes an extrusion device 101, having an inner bore 102 with a screw type conveyor 103 or the like therein, with suitable facility, such as voids, channels or the like 104 for providing a temperature control jacket. The screw 103 is adapted to deliver material into a chamber 105 disposed inside a housing 106 built along the lines of the apparatus 18 of FIG. 1, and the details of construction will therefore not be repeated here. A die plate 107 is provided, also comprising upstream plate 108 and downstream plate 110. The plate 108 is a cylinder as illustrated, but is fixed against rotation within the housing 106, as illustrated in FIG. 5, and is provided with a plurality of openings 111, of some convenient size, such as 3/8 inch diameter, and arranged in some pattern, as a set, convenient for passing material from the chamber 105 such as into channels such as 112 of the rotatable member 113. In the position of the inner cylinder 110 illustrated in FIGS. 5 and 8, for example, material passing through the holes 111 is reduced in size to about 1/8 inch in diameter, when that is the size of the holes 114.

Upon rotation of the downstream plate 110, through arcs of approximately 120°, the other sets of holes 115 and 116 may be brought into registry with holes 111.

It will thus be clear that, depending upon the number of sets of holes placed in the inner cylinder 110, the discharge of material through the registered holes provided by the plates 110 and 111 may be controlled in size, as desired, in order to maintain careful control over pellet size, or for any other reason.

If it is desired to alter the pellet size, or for any other reason to utilize a different set of holes, the inner cylinder may be rotated through an arc that brings the next or another set of holes into registry with the fixed set of holes, and pellets of another size may be made, if desired.

It will further be noted that the holes in the fixed plate 108 may be of sizes other than 3/8 inch. Also, the three sets of holes, embodying holes of different sizes, namely 1/8 inch, 1/4 inch, and 3/8 inch in diameter, corresponding respectively to the holes 114, 115, and 116 may be utilized if desired, or other sizes of holes may also be utilized. Also, various other combinations may be made, depending upon the particular desired conditions, particular material, or for any other reason.

The present invention, particularly as regards this embodiment of FIGS. 5 through 9, is especially adaptable to facilitating quick-changing of the downstream die plate. Mere rotation of die plate 110 through an arc of, for example, 120°, or the like, does this. Thus, all of the sets of holes about the die plate 110 may be of the same size, such that the rotation effects only a replacement.

It will further be apparent that various other configurations may be made in the holes 111, or in the various holes and patterns of the movable cylinder or die plate, as for example, by undercutting holes, by providing specific cross-sectional configurations other than circular, by chamfering inlet or discharge ends of the holes, by using frusto-conically configured holes or the like, all within the spirit and scope of this aspect of the invention.

Figure 6:
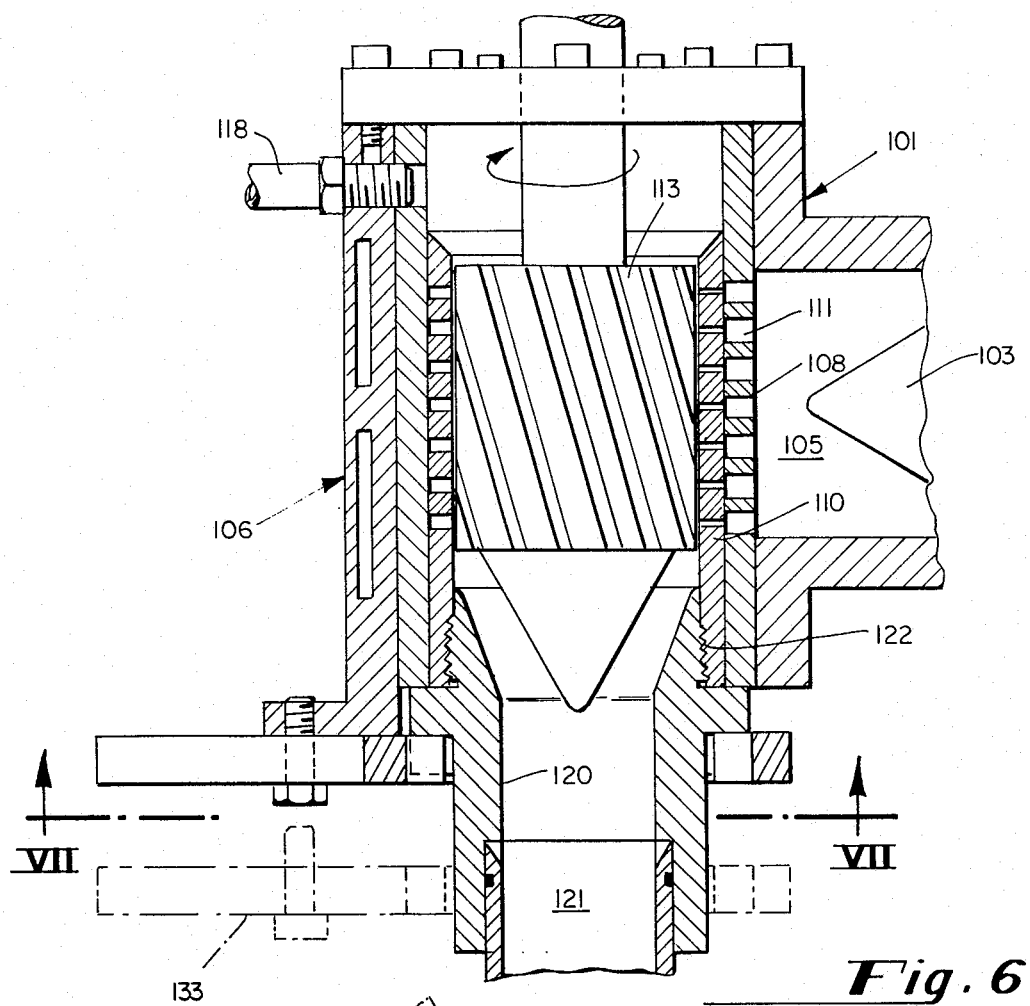
FIG. 6 is a view similar to that of FIG. 2, but taken along the line VI—VI of FIG. 5.

With reference to FIGS. 5 and 6, it will be apparent that the operation of the cutter member 113 and the treatment fluid delivered through the port 118, all are in accordance with that disclosed in FIGS. 1 and 2, and such details will not be repeated here.

Severed pellets are delivered, together with treatment fluid, into a downstream duct 120, (FIG. 6) that is also connected to a chamber 121, duct 120 being threaded at 122 to downstream orifice plate 110.

A wrench 123 is provided, with lugs 124 disposed in slots or notches 125, having a handle 126 having a threaded member 127 engaging the same with an ear 128 of the casing 106. The threaded member 127 maintains the angular position of the members 120 and 110, when threaded in engagement as illustrated in FIGS. 6 and 7, inasmuch as the lugs 124 are keyed into slots or keyways 125.

Figure 7:
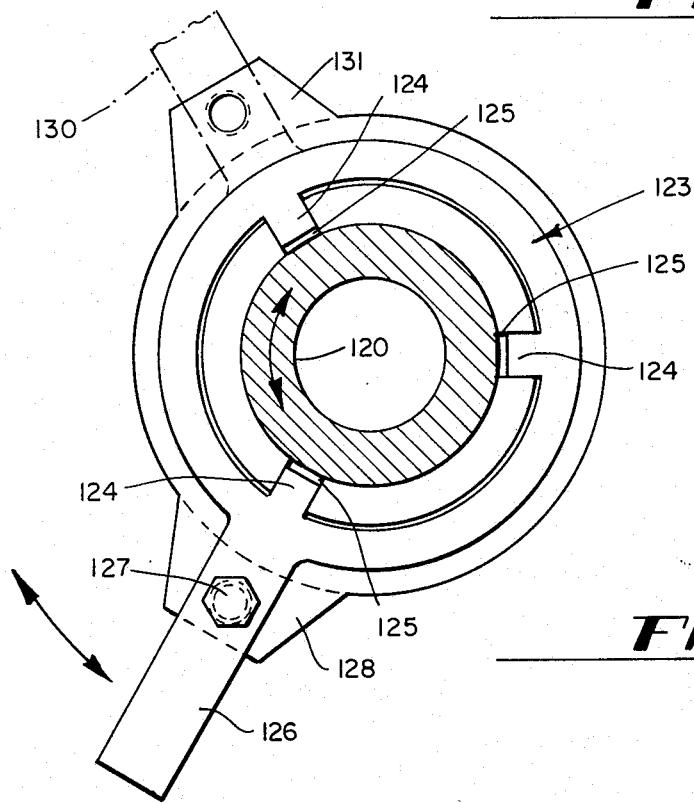
FIG. 7 is a view taken along the line VII—VII of FIG. 6.

When it is desired to turn the inner cylinder 110 to bring another set of holes into registry, and if the holes are 120° apart as illustrated in FIGS. 5 through 7, for example, the bolt 127 may be unthreaded from the position illustrated in FIG. 7, and the handle 126 then grasped and rotated through an arc of approximately 120°, with the bolt 127 then being reinserted when the handle 126 is in the phantom position 130 illustrated in FIG. 7. The fastener 127 is then in engagement with an ear 131, and another set of holes are in registry with the holes 111.

As an alternative, if it is not desired to utilize a plurality of fastening ears such as 128, 131, only a single ear such as 128 may be provided, and with re-positioning taking place by removal of threaded member 127 from ear 128, angular movement of the wrench 123 an amount sufficient to bring another set of holes into registry with the holes 111 (for example, 120°), followed by retraction of the wrench 133 away from the casing member 106, as illustrated by the phanton illustration 133 of FIG. 6, followed by angular return movement of the wrench 123 to the position illustrated in FIG. 7, such that the threaded member 127 may again be threaded into the ear 128, to bring the lugs or keys 124 back into engagement within other notches or keyways 125, upon return of the wrench 123 to the full line position illustrated in FIG. 6. It will be apparent that when the wrench 123 is retracted to the phantom position, the keys 124 are removed from the keyway, in order to permit the return angular movement of the wrength 123, without returning the cylinder 110 to its original position. This procedure may be followed, or reversed, depending upon whether a next successive set of holes is desired for registration with the holes 111, or whether the originally presented set is desired to be registered, depending upon operating conditions existing at any time, within the breadth and freedom of this invention.

Figure 10:
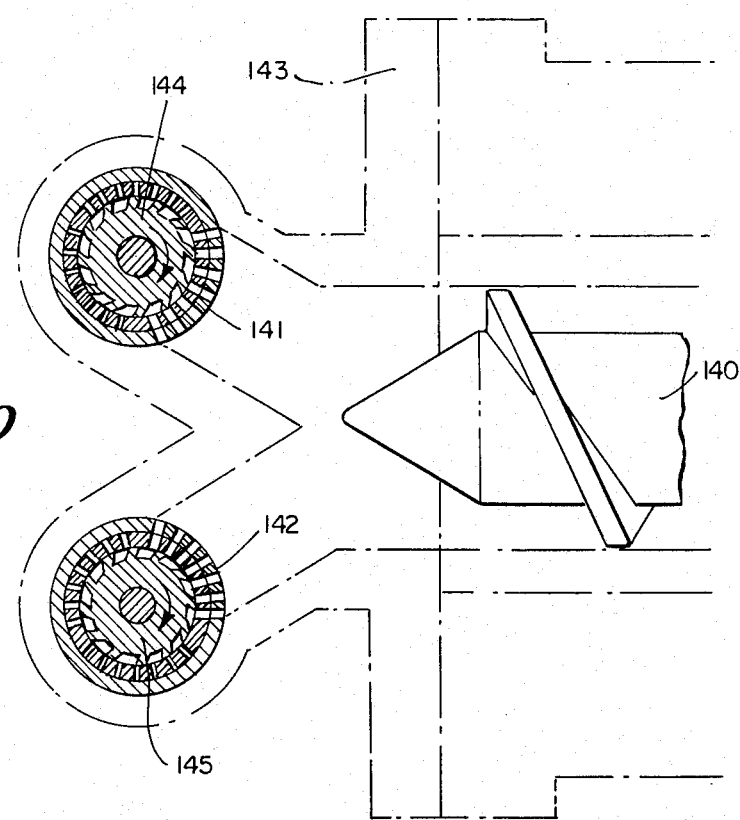
FIG. 10 is a schematic showing of a duel face-cutting apparatus made in accordance with the present invention.

Production volume may be increased by making use of duplex face-cutters of the type illustrated in FIG. 10. Here, feed screw 140 supplies two die plate means 141, 142 in parallel. These die plate means are part of a modified cutter-head 143, and otherwise are arranged preferably as illustrated in FIGS. 6 and 7, or in FIGS. 1 and 2. Each of the die plate means 141, 142, is preferably constructed along the lines of comparable structures of FIGS. 5 through 7, with its own cutter means 144, 145 disposed therein, with such cutter means being constructed generally similar to 113 of FIG. 6, for example.

Figure 11:
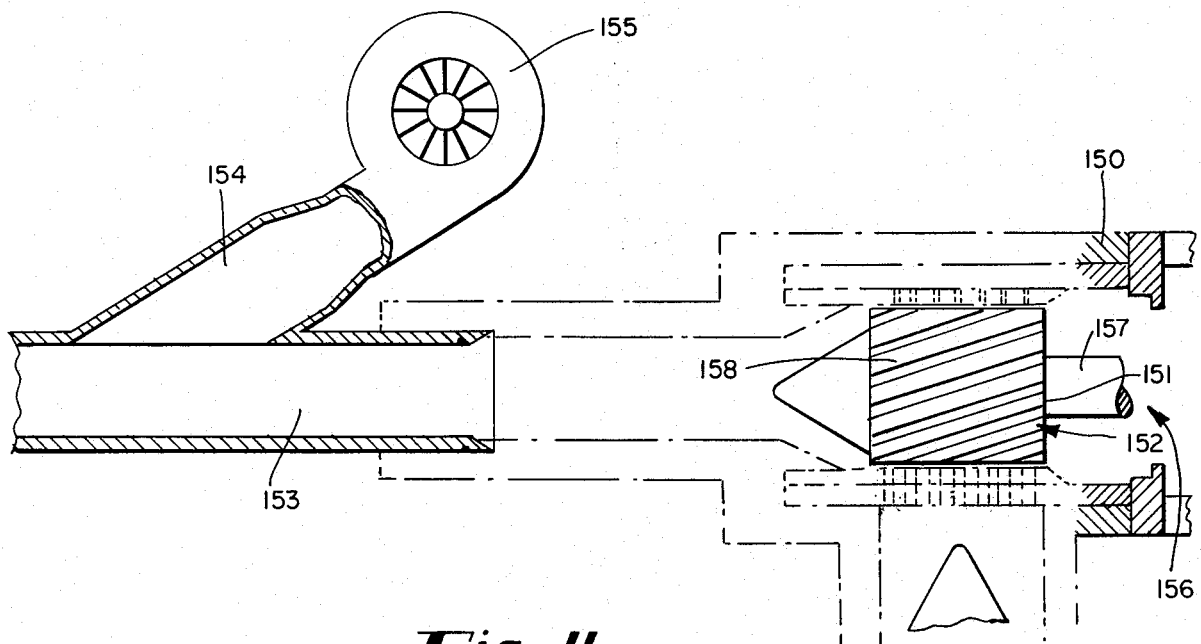
FIG. 11 is a schematic showing of a modified enclosure system for the cutter in which air is used as the pellet-treating fluid.

A modified cutter head 150 is illustrated in FIG. 11. The head 150 lacks the shaft seal 34 of FIG. 2. As a consequence, face 151 of cutter 152 is exposed to ambient atmosphere. In this modification, the receiver tube 153 is provided with a Y-shaped extension 154 inclined with respect to the axis of the tube 153. Air blower 155 exhausts into extension 154, aspirating air through opening 156 that provides clearance for the shaft 157. Thus, ambient air is made to serve as the treatment fluid as it flows through channels 158 of cutter means 152 aided by the pumping action of the cutter blades of the cutter means 152.

It will be apparent from the foregoing, that various modifications may be made in the details of construction, the inter-relationship and alternative arrangement of various components of the embodiments illustrated, and in the use and operation of the apparatus of this invention, all within the spirit and scope of the appended claims.

What is claimed is:

1. Face cutting apparatus for making pellets of thermoplastic material comprising:

a. an extrusion device including at least one concavely shaped die plate means having a plurality of spaced-apart extrusion orifices through which heat-plastified material is adapted to be extruded;

b. cutter means having a cylindrical body mounted for rotation about its longitudinal axis which is aligned with the axis of said die plate means, said die plate means cylindrically enclosing the cutter means and having a center concentric with the center of said cutter means;

c. said cutter means also having a plurality of spaced-apart blades projecting radially from and extending longitudinally along said body, said die plate means being closely spaced from said cutter blades all around the periphery of said cutter to define confined channels between said blades d. each of said blades having on its free end, a cutting edge which is closely spaced adjacent to the downstream face of said die plate means upon rotation of said cutter means and which is adapted to shear heat-plastified material extruded through said orifices into pellets;

e. adjacent pairs of said blades and the intervening body portion of said cutter means together with said die plate means establishing longitudinally extending substantially enclosed channels between said blades in which said pellets are adapted to flow.

2. Face cutting apparatus according to claim 1 wherein said blades are helically arranged on said body.

3. Face cutting apparatus according to claim 2 including means supplying pellet-treatment fluid to said cutter means to cause said fluid to flow longitudinally over said body and in said channels to flush said pellets toward the other axial end of said cutter means in the same axial direction in which the helically arranged blades advance said pellets during rotation of said cutter means.

4. Face cutting apparatus according to claim 2 including means associated with said opening for causing ambient air to blow longitudinally of said cutter means for flushing said pellets from said channels.

5. Face cutting apparatus according to claim 1 wherein said extrusion device includes:

a. at least a second cylindrically shaped die plate means having a plurality of radially extending extrusion orifices through which heat-plastified material is adapted to be extruded;

b. said cutter means being aligned with the axis of said second die plate means.

6. Face cutting apparatus according to claim 1 wherein said die plate means comprises a pair of nested die plates one of which is mounted for selective rotatable positioning relative to the other, with each plate of said pair of plates having orifices, and moving means for selectively changing the relative positions of said die plates.

7. Face cutting apparatus according to claim 6, wherein said moving means comprises a lever attached to the one die plate of said pair of die plates for manually changing the angular position thereof.

8. Face cutting apparatus for use in making pellets of thermoplastic material comprising longitudinally disposed chamber means, means operatively associated with said chamber means for conveying material in said chamber means for extruding the material therethrough, die plate means arranged downstream of said chamber means having orifice means therein for passing the extrudate therethrough, rotatable cylindrical cutter means disposed with its axis at an angle to the axis of the chamber means, and with its axis aligned with the axis of the die plate means, said die plate means having at least the portion thereof that faces the chamber means presenting a convex face portion to said chamber means, with the downstream side of said die plate means having a concave inner surface, said cutter means being disposed within said concave inner surface, said cutter means having a plurality of spaced-apart blades projecting radially from and extending longitudinally along said body; each of said blades having on its free end a cutting edge which is spaced at close running clearance from the downstream face of said die plate means upon rotation of said cutter means and which is adapted to shear heat-plastified material extruded through said orifices into pellets; adjacent pairs of said blades and the intervening body portion of said cutter means establishing longitudinally extending channels in which said pellets are adapted to flow.

9. The apparatus of claim 8, wherein said die plate means comprises at least one member of cylindrical configuration.

10. The apparatus of claim 8, wherein said die plate means comprises a pair of concentric cylinders, a rotatable one of which is disposed inside a fixed said cylinder, with extrudate-passing openings in each said cylinder.

11. The apparatus of claim 10, wherein the axis of said cutter means intersects said axis of said chamber means at approximately a right angle.

12. The apparatus of claim 8, wherein said die plate means comprises a pair of nested plate members, the upstream-most one of which is fixedly positioned, and the downstream-most one of which is rotatably movable, with at least said rotatably movable member being of generally cylindrical configuration, with both said plate members having extrudate-passing holes therethrough, and means for rotating said movable plate member relative to said fixedly positioned plate member for bringing holes in said plates into and out of registry with each other.

13. The apparatus of claim 12, wherein said movable plate member is provided with a plurality of sets of angularly spaced holes, and wherein said rotating means comprises means for selectively positioning any selected one of said sets of holes in registry with the holes in the fixedly positioned plate.

14. The apparatus of claim 13, including detent means for facilitating the accurate positioning of a selected said set of holes, after movement of said movable plate member.

15. The apparatus of claim 14, wherein there are three said sets of holes in said movable plate member disposed approximately 120° apart.

16. The apparatus of claim 14, wherein the sets of holes in said movable plate member are of different size holes from set to set.

17. The apparatus of claim 14, wherein the sets of holes in said movable plate member are of the same size from set to set.

18. The apparatus of claim 12, wherein said means for rotating comprise manually engageable lever means.

19. The apparatus of claim 18, wherein said lever means is of the wrench type having key means engageable within keyway means, and including means for fastening said lever means in a given desired position.

20. The apparatus of claim 12, wherein said nested die plate members are each of cylindrical configuration, and wherein the axis of said cutter means intersects said axis of said chamber means at approximately a right angle.

21. The face cutting apparatus defined in claim 1, wherein each of said blades is helically arranged along said cylindrical body at a helix angle relative to the axis of said body of less than 45°.

22. The face cutting apparatus defined in claim 1, wherein the widths of said channels are less than three times the distance between centers of said orifices.

23. The face cutting apparatus defined in claim 1, wherein a plurality of rows of orifices are provided in said orifice plate, said rows being concavely shaped.

* * * * *